United States Patent
Rhee

(10) Patent No.: US 6,629,176 B1
(45) Date of Patent: Sep. 30, 2003

(54) ARBITER ARCHITECTURE ALLOWING RAPID IMPLEMENTATION OF ARBITRATION POLICIES

(75) Inventor: Que-Won Rhee, Palo Alto, CA (US)

(73) Assignee: Agilent Technologies, Inc., Palo Alto, CA (US)

( * ) Notice: Subject to any disclaimer, the term of this patent is extended or adjusted under 35 U.S.C. 154(b) by 0 days.

(21) Appl. No.: 09/432,817

(22) Filed: Nov. 2, 1999

(51) Int. Cl.[7] .................. G06F 12/00; G06F 13/00; G06F 13/36
(52) U.S. Cl. .................. 710/240; 710/309; 710/100
(58) Field of Search .................. 710/309, 113, 710/114, 115, 116, 112, 111, 107, 100, 108, 121, 119, 120, 200, 220, 240, 242, 243, 244, 241

(56) References Cited

U.S. PATENT DOCUMENTS

| | | | | |
|---|---|---|---|---|
| 5,067,071 A | * | 11/1991 | Schanin et al. | 710/113 |
| 5,509,125 A | * | 4/1996 | Johnson et al. | 710/120 |
| 6,157,989 A | * | 12/2000 | Collins et al. | 711/151 |
| 6,199,124 B1 | * | 3/2001 | Ramakrishman et al. | 710/40 |

OTHER PUBLICATIONS

I²C–Bus Specification, Version 2.0, Dec. 1998 (available from Philips Semiconductor, Inc., or on the internet at "http://www–us2.semiconductors.philips.com/acrobat/various/I2C_BUS_SPECIFICATION_2.pdf", pp. 12–13.

* cited by examiner

Primary Examiner—Tim Vo

(57) ABSTRACT

An arbiter allocates resources to a set of requesters. The arbiter includes vector assembly logic and sort logic. The vector assembly logic generates, for each arbitration round, an arbitration vector for each requester in the set of requesters. The sort logic receives the arbitration vectors generated by the vector assembly logic. Based on values of the arbitration vectors, the sort logic designates, for each arbitration round, a requester from the set of requesters as winner.

8 Claims, 5 Drawing Sheets

ARBITER ARCHITECTURE ALLOWING RAPID IMPLEMENTATION OF ARBITRATION POLICIES

BACKGROUND

The present invention concerns arbitration within a computing system and pertains specifically to an arbiter architecture that allows rapid implementation of arbitration policies.

Within computer systems it is often necessary to allocate limited resources using some sort of arbitration scheme. For example, arbitration is used to allocate access to resources such as memory, networks, interfaces, busses and so on. Arbitration policies determine winners based on system criteria such as requester need, requester priority and system fairness.

Typically, arbiters are individually designed with logic dependent upon the specific arbitration policies implemented. Arbiters are often in a critical timing path. Early estimates of logic complexity help enable complexity verse speed tradeoffs.

When performing arbitration, some bus protocols, for example the $I^2C$ bus protocol, use Carrier Sense Multiple Access/Collision Detect (CSMA/CD) for arbitration. See the $I^2C$-Bus Specification, Version 2.0, December 1998 (available from Philips Semiconductor, Inc., or on the internet at "http://www-us2. semiconductors.philips.com/acrobat/various/ I2C__BUS__SPECIFICATION__2.pdf", pp. 12–13. The Ethernet protocol also uses CSMA/CD. In CSMA/CD arbitration scheme requesters are not synchronized.

The CAN bus protocol uses Carrier Sense Multiple Access/Collision Detect and Arbitration on Message Priority (CSMA/CD+AMP). In this arbitration scheme the identity (ID) numbers are used during arbitration.

SUMMARY OF THE INVENTION

In accordance with the preferred embodiment of the present invention, an arbiter allocates resources to a set of requesters. The arbiter includes vector assembly logic and sort logic. The vector assembly logic generates, for each arbitration round, an arbitration vector for each requester in the set of requesters. The sort logic receives the arbitration vectors generated by the vector assembly logic. Based on values of the arbitration vectors, the sort logic designates, for each arbitration round, a requester from the set of requesters as winner.

For example, for each arbitration round, the requester from the set of requesters that is designated as the winner is the requester that has a highest arbitration vector value.

In one embodiment of the present invention a simple round robin arbitration policy is implemented. The vector assembly logic includes a counter that generates a count. A decoder receives the count and generating for each requester a single bit arbitration value as the arbitration vector.

In another embodiment of the present invention, a round robin arbitration policy with a right of refusal is implemented. In this case, a counter generates a count. Assembly logic receives the count and receives a ready bit from each requester in the set of requesters. The assembly logic generates for each requester a multiple bit arbitration value as the arbitration vector.

In another embodiment of the present invention, requester priority arbitration policy with tie-breaking capability is implemented. The vector assembly logic includes a counter that generates a count. The assembly logic receives the count and receives a priority vector from each requester in the set of requesters. The assembly logic uses the priority value and the count to generate a multiple bit arbitration value as the arbitration vector. Alternately, both the counter and a ready bit from each requester may be used for tie-breaking.

The bifurcated architecture of the arbiters set out in various embodiments of the present invention allows for rapid implementation of a variety of arbitration policies.

DESCRIPTION OF THE PREFERRED EMBODIMENT

Figure 1:
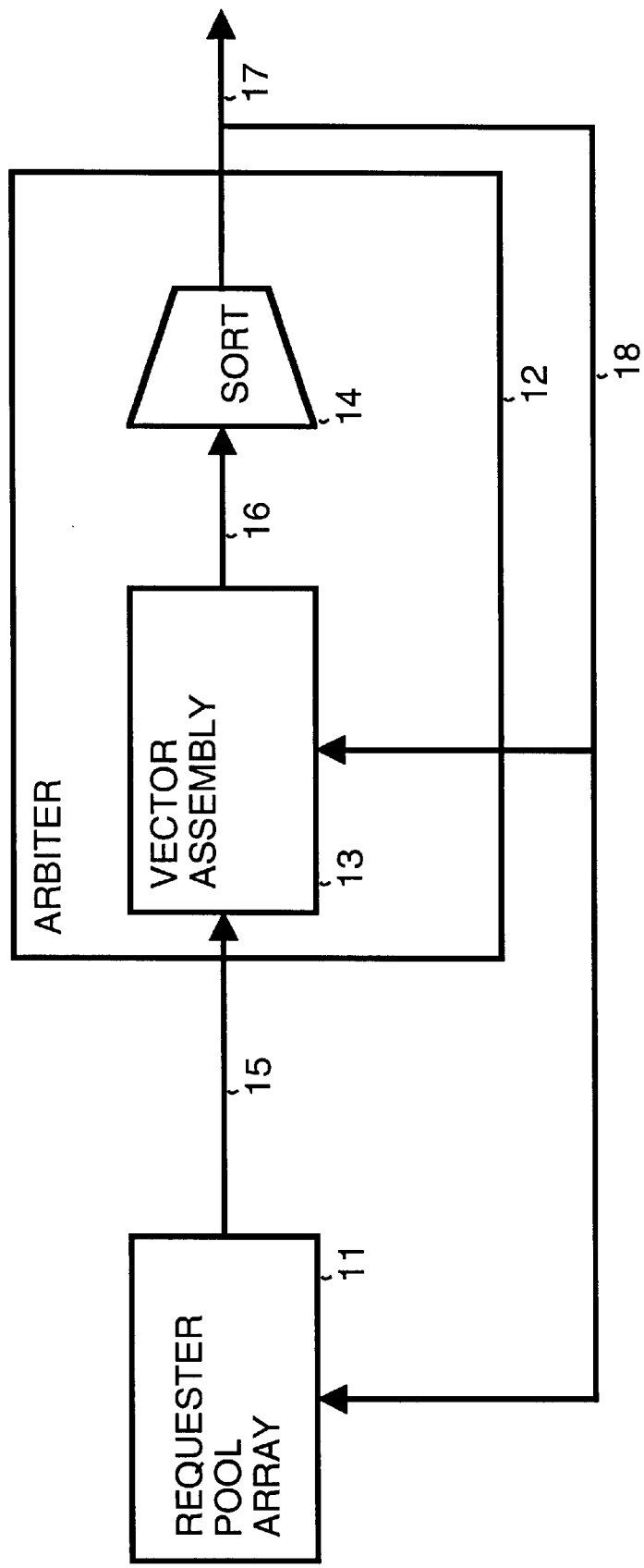
FIG. 1 is a block diagram that illustrates an arbiter architecture in accordance with a preferred embodiment of the present invention.

FIG. 1 is a block diagram that illustrates an arbiter architecture in accordance with a preferred embodiment of the present invention. A requester pool array 11 consists of entities vying for a limited resource. For each arbitration round, an arbiter 12 awards the limited resource to one of the requesters. Arbiter 12 is divided into two sections. A vector assembly block 13 implements the arbitration policies by computing a vector for each requester. The vectors are ordered in a sort block 14. For each arbitration round, the requester with the largest vector wins.

Depending on the arbitration policy used, vector assembly 13 utilizes input from each requester, as represented by an arrow 15. For each arbitration round, vector assembly generates a vector value for each requester that serves as input to sort block 14, as represented by an arrow 16. Sort block 14 generates an output that indicates a winner of the arbitration round, as represented by an arrow 17. Depending on the implementation of the arbitration policy, the output from sort block 14 may be fed back to the requesters in requester pool array 11 and/or vector assembly block 13, as represented by a feedback line 18.

Figure 2:
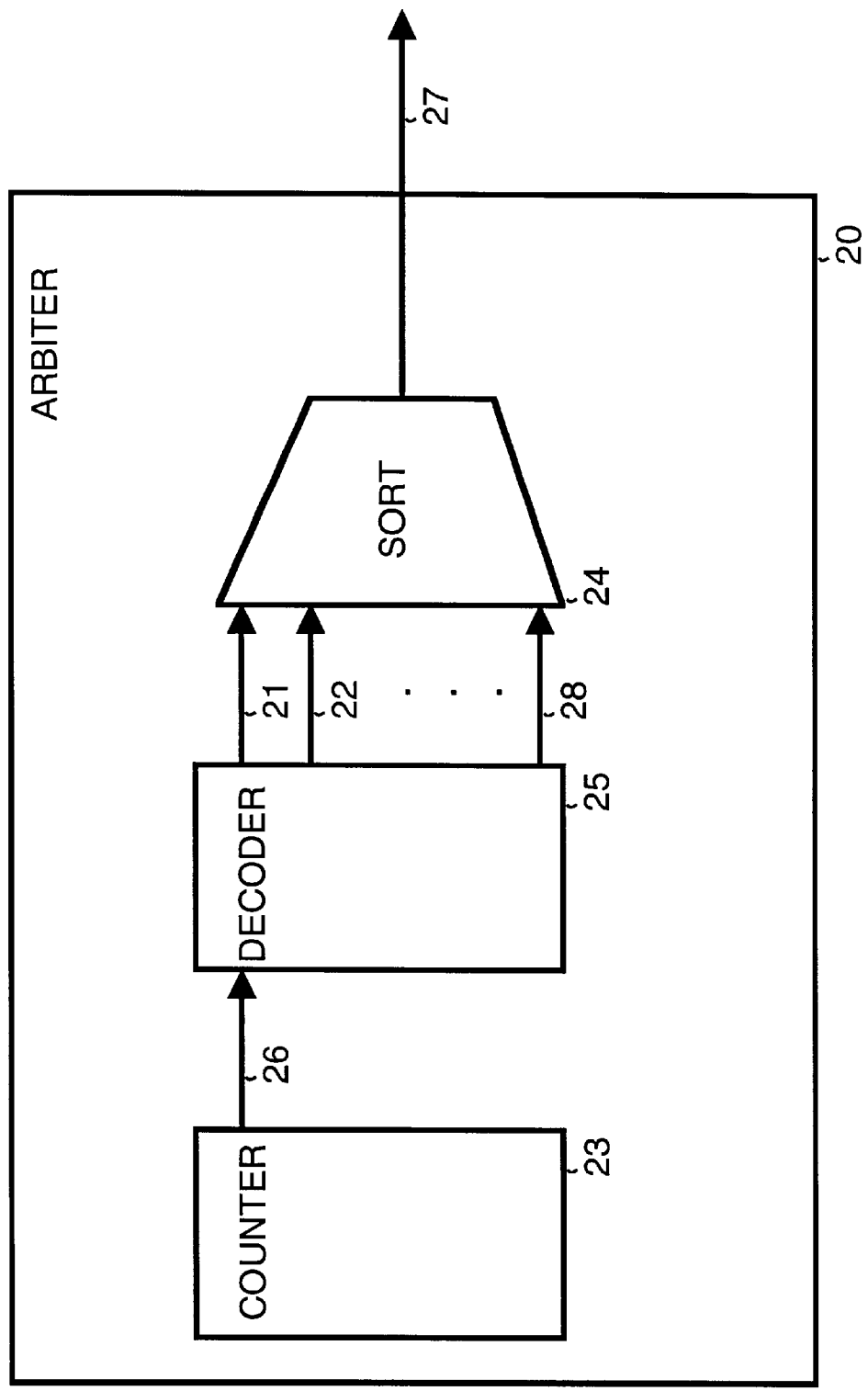
FIG. 2 is a block diagram that shows an arbiter that implements a simple round-robin arbitration policy in accordance with a preferred embodiment of the present invention.

For example, FIG. 2 is a block diagram of an arbiter 20 that implements a simple round-robin arbitration policy. The vector assembly of arbiter 20 consists of a counter 23 and a decoder 25. Counter 23 increments between each arbitration round. Decoder 25 receives a count output 26 and generates a one bit arbitration vector for each requester. These one bit vectors are represented in FIG. 2 by arrows 21, 22 and 28. The one bit arbitration vector is set at one for the requester that has won the arbitration round. The one bit vector is set at zero for every requester that has not won the arbitration round.

The counter counts continuously from 0 to n-1, where n is the number of requesters in the requester array. Table 1 below describes the vector values for vectors generated by decoder 25.

TABLE 1

| Requester Number | Arbitration vector (1 bit wide) |
|---|---|
| 1 | (counter == 0) |
| 2 | (counter == 1) |
| . | . |
| . | . |
| . | . |
| n | (counter == n − 1) |

A sort logic block 24 receives the arbitration vector for each requester and generates a value (represented by an arrow 27) that indicates which requester has won the arbitration round. For example, sort logic block 24 is an encoder.

Figure 3:
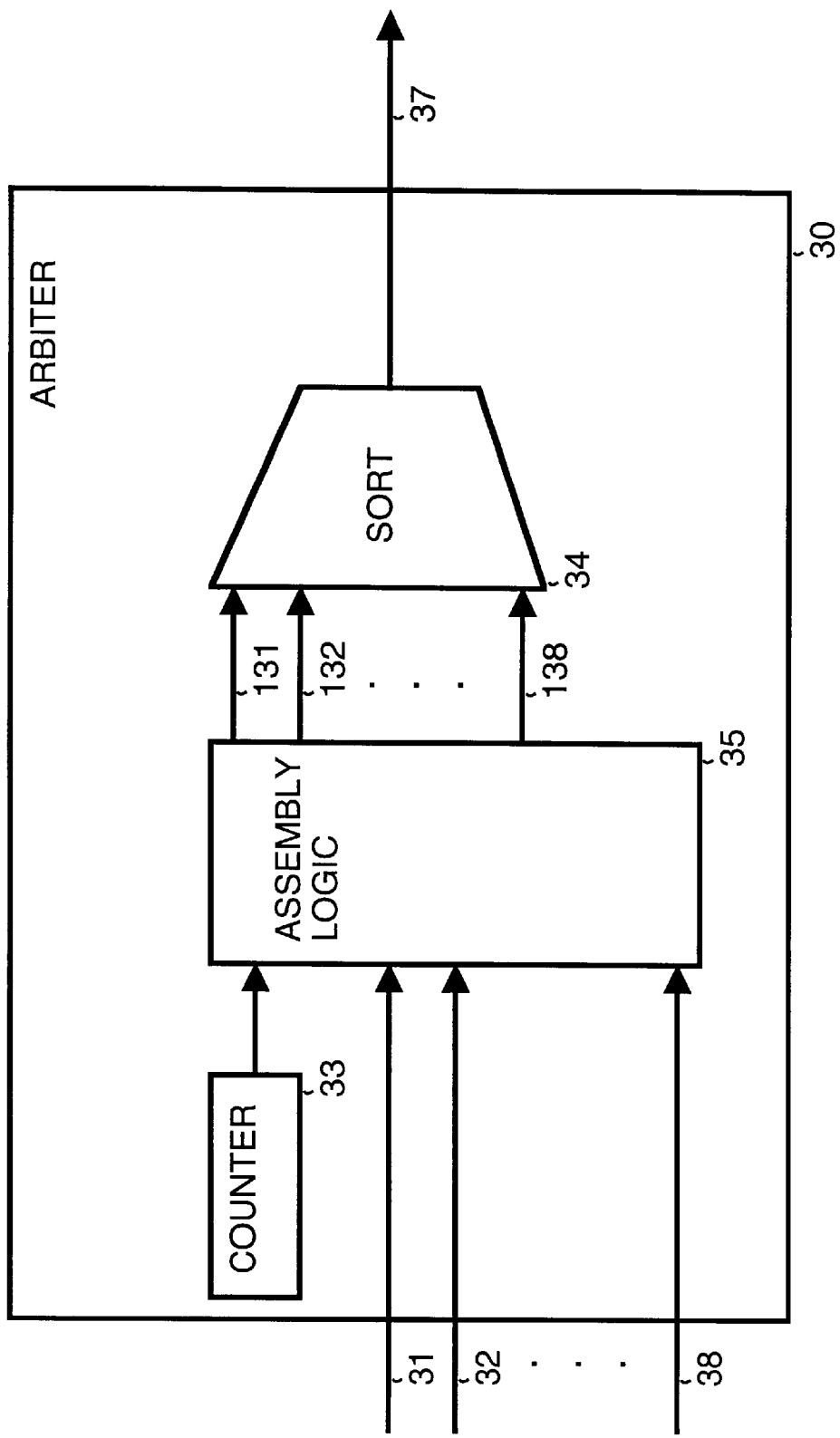
FIG. 3 is a block diagram that shows an arbiter that implements a right of first refusal round-robin arbitration policy in accordance with a preferred embodiment of the present invention.

FIG. 3 is a block diagram of an arbiter 30 that implements a round-robin arbitration policy that allows each requester a right of first refusal. The vector assembly of arbiter 30 consists of a counter 33 and assembly logic 35. Counter 33 increments between each arbitration round. Assembly logic 35 receives a count from counter 33. The count indicates a requester. In addition, assembly logic 35 receives from each requester, a ready bit on a requester line. On a ready line 31 a first requester places a ready bit ($Rdy_1$). On a ready line 32 a second requester places a ready bit ($Rdy_2$). On a ready line 38 an $n^{th}$ requester places a ready bit ($Rdy_n$). And so on. For example, the requester refuses an arbitration victory by holding its ready bit to logic zero.

For each requester, assembly logic 35 generates an arbitration vector that is the concatenation of the ready bit from the requester with a value indicating the distance from the current count. The value for the distance is m bits wide where m=ceil ($\log_2(n)$), where there are n requesters. The m+1 bit arbitration vectors are represented in FIG. 3 by arrows 131, 132 and 138.

Counter 33 counts continuously from 0 to n−1, where n is the number of requesters in the requester array. Table 2 below describes the m+1 bit arbitration vector generated by assembly logic 35 for each requester.

TABLE 2

| Requester Number | Arbitration vector (m + 1 bits wide) |
|---|---|
| 1 | {$Rdy_1$, (count) mod n} |
| 2 | {$Rdy_2$, (count + 1) mod n} |
| . | . |
| . | . |
| . | . |
| n | {$Rdy_n$, (count + n − 1) mod n} |

A sort logic block 34 receives the arbitration vector for each requester and generates a value (represented by an arrow 37) that indicates which requester has won the arbitration round.

If a more uniform distribution among ready requesters is desired, counter 33 can be replaced with a pseudo-random linear feedback shift register (LFSR) implementation.

Figure 4:
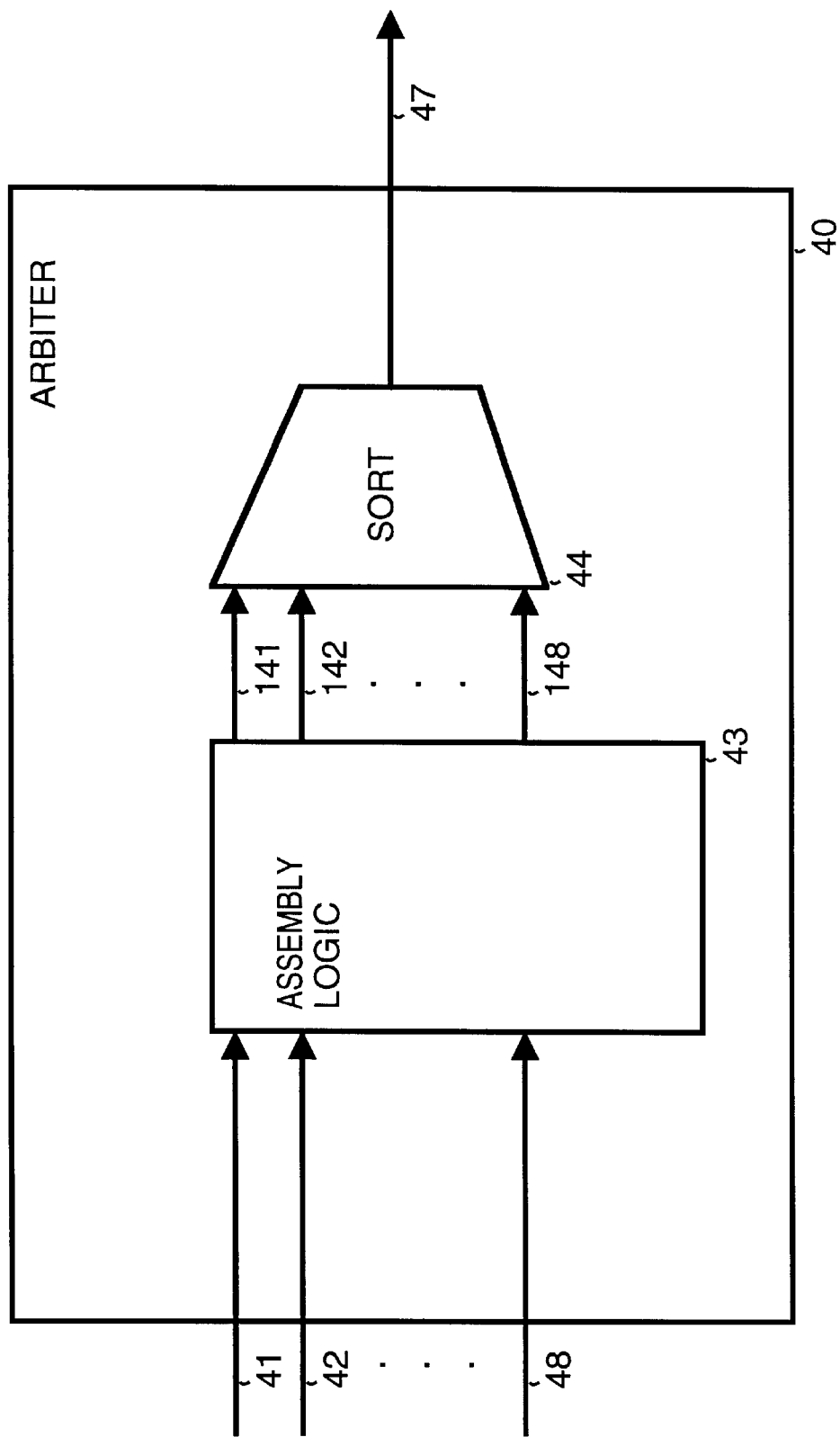
FIG. 4 is a block diagram that shows an arbiter that implements a requester priority arbitration policy in accordance with a preferred embodiment of the present invention.

FIG. 4 is a block diagram of an arbiter 40 that implements a priority arbitration policy in which each requester provides a priority field (i bits wide). The vector assembly of arbiter 40 consists of assembly logic 43. Assembly logic 43 receives from each requester, a priority vector. The number of bits (i) of each priority depends upon the number of priority levels in the system. Assembly logic 43 receives an i-bit priority vector from a first requester, as represented by an arrow 41. Assembly logic 43 receives an i-bit priority vector from a second requester, as represented by an arrow 42. Assembly logic 43 receives an i-bit priority vector from an n requester, as represented by an arrow 48. And so on.

For each requester, assembly logic 43 generates an arbitration vector based on the priority vector received from the requester. Table 3 below describes the arbitration vector generated by assembly logic 43 for each requester.

TABLE 3

| Requester Number | Arbitration vector (m bits wide) |
|---|---|
| 1 | (priority vector$_1$) |
| 2 | (priority vector$_2$) |
| . | . |
| . | . |
| . | . |
| n | (priority vector$_n$) |

A sort logic block 44 receives the arbitration vector for each requester and generates a value (represented by an arrow 47) that indicates which requester has won the arbitration round.

Figure 5:
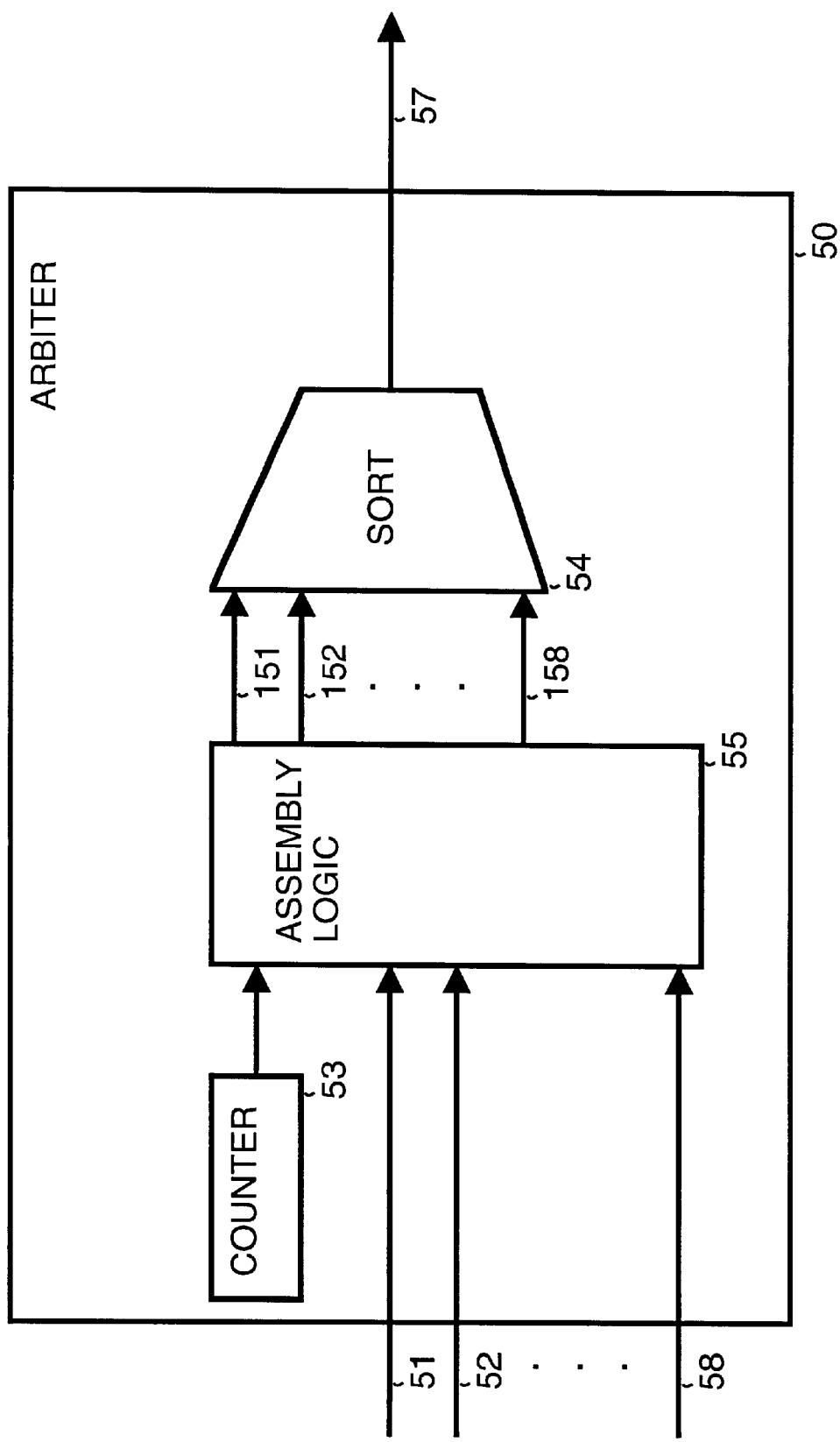
FIG. 5 is a block diagram that shows an arbiter that implements a requester priority arbitration policy with tie-breaking capability in accordance with a preferred embodiment of the present invention.

FIG. 5 is a block diagram of an arbiter 50 that implements a priority arbitration policy in which each requester provides a priority field (i bits wide). In addition, a tie-breaker is used to break ties in a fair manner. In one embodiment, the tie-breaker is generated based on a simple round robin. In this case, the vector assembly of arbiter 50 consists of assembly logic 55 and a counter 53. Assembly logic 55 receives from each requester, a priority vector. The number of bits (i) of each priority depends upon the number of priority levels in the system. Assembly logic 55 receives an i-bit priority vector from a first requester, as represented by an arrow 51. Assembly logic 55 receives an i-bit priority vector from a second requester, as represented by an arrow 52. Assembly logic 55 receives an i-bit priority vector from an $n^{th}$ requester, as represented by an arrow 58.

For each requester, assembly logic 55 generates an arbitration vector based on the priority vector received from the requester and a tie-breaker generated by counter 53. Table 4 below describes the arbitration vector generated by assembly logic 55 for each requester.

TABLE 4

| Requester Number | Arbitration vector ($\log_2$ (2n) bits wide) |
|---|---|
| 1 | {priority vector$_1$, (count) mod n} |
| 2 | {priority vector$_2$, (count + 1) mod n} |
| . | . |
| . | . |
| . | . |
| n | {priority vector$_n$, (count + n − 1) mod n} |

A sort logic block 54 receives the arbitration vector for each requester and generates a value (represented by an arrow 57) that indicates which requester has won the arbitration round.

In an alternate embodiment, the tie-breaker is generated based on a round-robin arbitration policy that allows each requester a right of first refusal. In this case, the vector assembly of arbiter 50 consists of assembly logic 55 and a counter 53. Assembly logic 55 receives from each requester, a priority vector and an additional ready bit.

For each requester, assembly logic 55 generates an arbitration vector based on the priority vector received from the requester, the ready bit and a tie breaker generated by counter 53. Table 5 below describes the arbitration vector generated by assembly logic 55 for each requester.

TABLE 5

| Requester Number | Arbitration vector ($\log_2 2n$) + 1 bits wide) |
|---|---|
| 1 | {priority vector$_1$, Rdy$_1$, (count) mod n} |
| 2 | {priority vector$_2$, Rdy$_2$, (count + 1) mod n} |
| . | . |
| . | . |
| . | . |
| n | {priority vector$_n$, Rdy$_n$, (count + n − 1) mod n} |

The foregoing discussion discloses and describes merely exemplary methods and embodiments of the present invention. As will be understood by those familiar with the art, the invention may be embodied in other specific forms without departing from the spirit or essential characteristics thereof. Accordingly, the disclosure of the present invention is intended to be illustrative, but not limiting, of the scope of the invention, which is set forth in the following claims.

I claim:

1. An arbiter that allocates resources to a set of requesters, the arbiter comprising:
    vector assembly logic, the vector assembly logic generating, for each arbitration round, an arbitration vector for each requester in the set of requesters, wherein the vector assembly logic comprises:
        a counter that generates a count, and
        a decoder, the decoder receiving the count and generating for each requester a single bit arbitration value as the arbitration vector; and,
    sort logic that receives the arbitration vectors generated by the vector assembly logic and based on values of the arbitration vectors designating, for each arbitration round, a requester from the set of requesters as winner.

2. An arbiter that allocates resources to a set of requesters, the arbiter comprising:
    vector assembly logic, the vector assembly logic generating, for each arbitration round, an arbitration vector for each requester in the set of requesters, wherein the vector assembly logic comprises:
        a counter that generates a count, and
        assembly logic, the assembly logic receiving the count and receiving a ready bit from each requester in the set of requesters, the assembly logic generating for each requester a multiple bit arbitration value as the arbitration vector; and,
    sort logic that receives the arbitration vectors generated by the vector assembly logic and based on values of the arbitration vectors designating, for each arbitration round, a requester from the set of requesters as winner.

3. An arbiter that allocates resources to a set of requesters, the arbiter comprising:
    vector assembly logic, the vector assembly logic generating, for each arbitration round, an arbitration vector for each requester in the set of requesters, wherein the vector assembly logic comprises:
        a counter that generates a count, and
        assembly logic that receives the count and that receives a priority vector from each requester in the set of requesters and for each requester uses its priority value and the count to generate a multiple bit arbitration value as the arbitration vector; and,
    sort logic that receives the arbitration vectors generated by the vector assembly logic and based on values of the arbitration vectors designating, for each arbitration round, a requester from the set of requesters as winner.

4. An arbiter as in claim 3 wherein the assembly logic also receives a ready bit from each requester in the set of requesters, and for each requester the assembly logic additionally uses the ready bit when generating the multiple bit arbitration value as the arbitration vector.

5. A system comprising:
    a set of resources; and,
    an arbiter that allocates resources to the set of requesters, the arbiter comprising:
        vector assembly logic, the vector assembly logic generating, for each arbitration round, an arbitration vector for each requester in the set of requesters, wherein the vector assembly logic comprises:
            a counter that generates a count, and
            a decoder, the decoder receiving the count and generating for each requester a single bit arbitration value as the arbitration vector; and,
        sort logic that receives the arbitration vectors generated by the vector assembly logic and based on values of the arbitration vectors designating, for each arbitration round, a requester from the set of requesters as winner.

6. A system comprising:
    a set of resources; and,
    an arbiter that allocates resources to the set of requesters, the arbiter comprising:
        vector assembly logic, the vector assembly logic generating, for each arbitration round, an arbitration vector for each requester in the set of requesters, wherein the vector assembly logic comprises:
            a counter that generates a count, and
            assembly logic, the assembly logic receiving the count and receiving a ready bit from each requester in the set of requesters, the assembly logic generating for each requester a multiple bit arbitration value as the arbitration vector; and,
        sort logic that receives the arbitration vectors generated by the vector assembly logic and based on values of the arbitration vectors designating, for each arbitration round, a requester from the set of requesters as winner.

7. A system comprising:
    a set of resources; and,
    an arbiter that allocates resources to the set of requesters, the arbiter comprising:
        vector assembly logic, the vector assembly logic generating, for each arbitration round, an arbitration vector for each requester in the set of requesters, wherein the vector assembly logic comprises:
            a counter that generates a count, and
            assembly logic that receives the count and that receives a priority vector from each requester in the set of requesters and for each requester uses the priority value and the count to generate a multiple bit arbitration value as the arbitration vector; and,
        sort logic that receives the arbitration vectors generated by the vector assembly logic and based on values of the arbitration vectors designating, for each arbitration round, a requester from the set of requesters as winner.

8. A system as in claim 7 wherein the assembly logic additionally a ready bit and uses the ready bit when generating the multiple bit arbitration value as the arbitration vector.

* * * * *